UNITED STATES PATENT OFFICE.

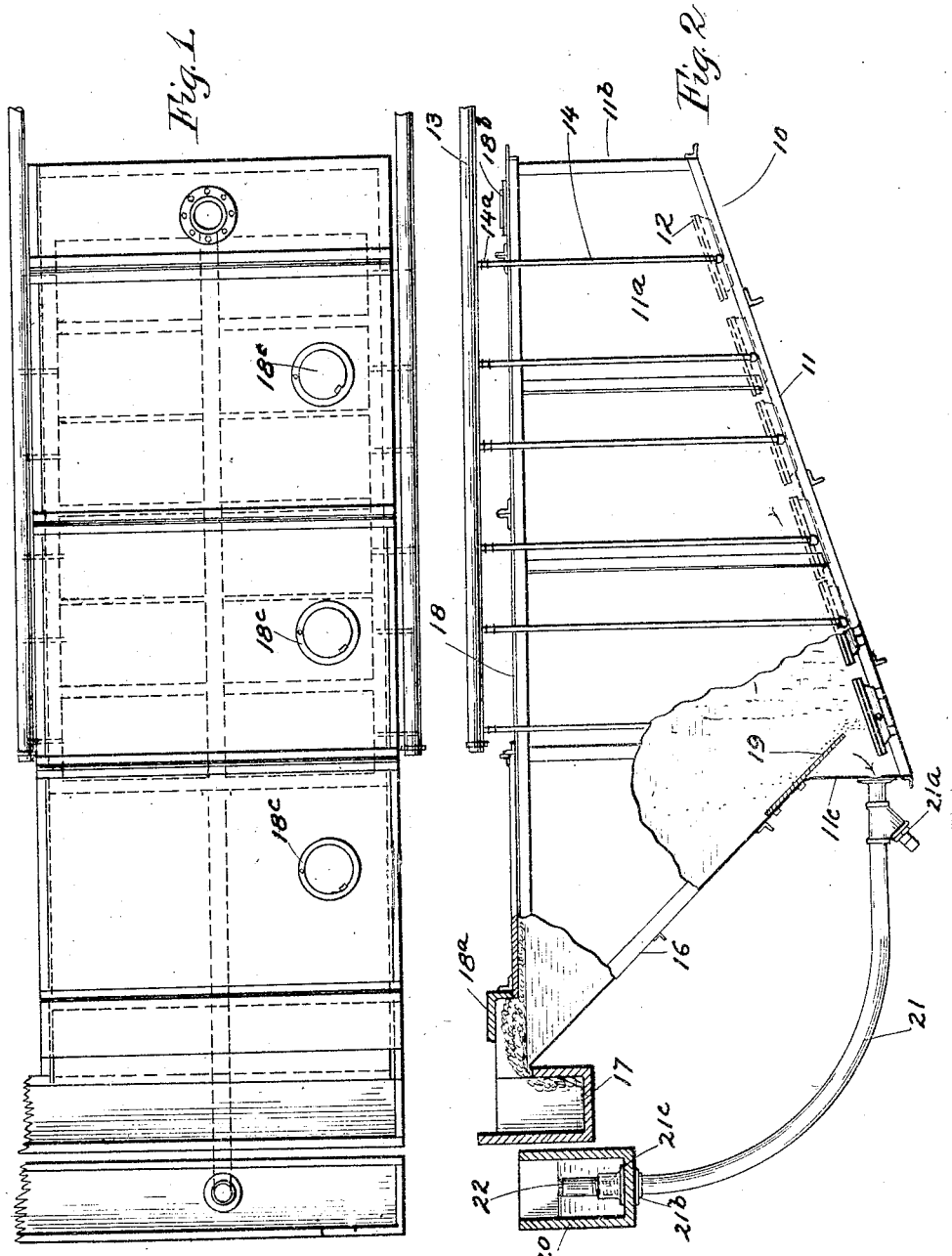

GEORGE C. RISER, JR., OF McGILL, NEVADA.

AERATION-CELL.

1,391,078.  Specification of Letters Patent.  Patented Sept. 20, 1921.

Application filed May 29, 1918. Serial No. 237,187.

*To all whom it may concern:*

Be it known that I, GEORGE C. RISER, Jr., a citizen of the United States, residing at McGill, in the county of White Pine and State of Nevada, have invented certain new and useful Improvements in Aeration-Cells, of which the following is a specification.

This invention relates to improvements in aeration cells, and has for its object to provide a new and improved form of cell for use in metal concentration, more especially for use in carrying out a process of concentration in which oiled mineral pulp in a fluid condition is subjected to aeration, the result being to carry the metalliferous particles upwardly through the fluid by means of the bubbles, these bubbles being delivered to a launder or trough provided to catch the concentrates.

An object of this invention is to provide a cell of the kind described which is covered for substantially its entire length, the cover providing in effect a seal extending beyond the zone of aeration substantially to the concentrate collecting trough or launder, the cover terminating short of such launder whereby the air or other gas utilized to raise the metal particles is allowed to escape. At the same time, this construction results in the automatic skimming or driving off of the bubbles by the air used for aeration.

Another object is the provision of a dead or non-aerated section in the cell over which the bubbles pass on the way to the concentrate launder, such dead area, as I term it, permitting the dropping down of gangue or tailing particles which may be carried by the bubbles.

Another object is the provision of an inclined apron or chute below such dead area, which will direct the dropping gangue and tailings to the bottom of the cell, this apron being so constructed as to direct the discharge load of the bubbles over aeration pans, so that any mineral particles dropping with the gangue will be subjected to further aeration and not discharged with the dropped gangue.

Still another object resides in the construction of the tailing discharge members so that the height of the point of discharge may be adjusted as desired to regulate the discharge of the tailings from the cell, the discharge pipe being further provided with a valve for quick draining of the cell.

These and other objects will be more fully set forth and described in the following specification and shown in the accompanying drawing, in which—

Figure 1 is a plan view of a cell embodying my invention; and

Fig. 2 is a side elevation of the same, parts being shown in section.

Like numerals refer to like elements throughout the drawing. 10 designates generally a cell having a sloping bottom 11 upon which are mounted a number of aeration pans 12, provided with suitable porous tops and in communication with a supply of air or other gaseous fluid transmitted through the main supply duct 13 and to the pans by means of the connecting pipes 14. Suitable valves $14^a$, being diagrammatically illustrated in Fig. 2, for example, are provided, such valves permitting individual adjustment of the aeration of each pan.

The cell is further provided with sides $11^a$ and end $11^b$. Extending upwardly from the lower end of the bottom 11 a short distance is the vertical wall $11^c$. Extending upwardly and outwardly from this wall $11^c$ is an inclined apron 16 leading to a point adjacent the transverse launder or trough 17, provided to catch the mineral-carrying particles or concentrates. Tightly fitted upon the side and end walls of the cell is the top 18, extending from the end wall $11^b$ almost to the launder 17, as shown in Fig. 2. Adjacent the launder 17 the top 18 is raised, or offset, as indicated by numeral $18^a$, to provide a ready escape for the concentrates, as will be obvious. A suitable feed pipe, not shown, may project through the manhole $18^b$ in the cover, and inspection ports $18^c$, suitably covered, as also provided in such cover at suitable locations. Extending downwardly from the apron 16 toward the bottom of the cell, and suitably secured to the apron by bolts, or the like, is a projecting plate 19, see Fig. 2, which extends to the point over the lowermost of the aeration pans for a purpose to be hereinafter described.

A tailing discharge trough or launder 20 is provided, this trough being in communication, through a discharge pipe 21, with the bottom of the cell 11, said pipe extending through the wall $11^c$ at a point adjacent the bottom of the cell, as shown in Fig. 2. Located in the pipe 21, adjacent its connection with the cell 11, is a quick discharge train $21^a$ normally closed by means of a plug, or the like. A pipe 21 is secured to a suitable flange or coupling 21ᵇ carried by the launder 20, and a similar flange 21ᶜ is located on the bottom of such launder, into which is threaded an upwardly extending section of pipe, or nipple, 22. Interchangeable sections of pipes of different lengths are provided, whereby the discharge point of the pipe 22 may be raised or lowered as desired, thereby regulating the amount of discharge from the cell, and regulating the amount of tailing discharge, as will be obvious.

In the operation of my cell, assuming that proper regulation and adjustment of the air feed and tailing discharge have been made, the pulp and fluid is fed in through the opening 18ᵇ until the overflow level is reached, and during the aeration thereof by the pans 12 the metal-carrying bubbles rise to the top. The sealing cover 18 prevents their overflow at the sides of the cell, and they must, as will be obvious, flow toward the trough or launder 17 until permitted to flow thereinto. The tendency of the pulp is to flow downwardly adjacent the bottom 11 of the cell, owing to the slope thereof, and toward the tailing discharge pipe 21, such flow carrying the pulp over the aeration pans in succession, and insuring treatment of substantially all of the pulp prior to its discharge through the pipe 21. After subjection to aeration from the last or lowermost of the pans 12, all of the bubbles must pass over the dead area in the cell lying above the apron 16, and during such travel across this dead area, as I term it, the tendency of any gangue or tailing particles carried by the bubbles is to break away therefrom and drop downwardly through the fluid upon the apron, the inclination of which directs the same downwardly toward the bottom of the cell 11. It happens that in some instances metalliferous particles also drop down, owing to breaking of the bubbles, etc., and to prevent these particles from being carried out with the tailings through the pipe 21, the apron extension, or plate, 19, is provided, which projects all of the dropped tailings and mineral particles into the cell 11 over the last aeration pan, whereby they are subjected to re-aeration, and the oily bubbles have an opportunity to pick up the mineral particles for which they have an affinity, and carry them to the top, thereby preventing to a great extent the flowing out of such metal particles with the tailings.

The provision of this dead area is very important, and results in a richer concentrate being obtained than where no such area is provided.

A meritorious feature of my invention is that all of the air or other gaseous fluid used for aeration must escape beneath the offset portion 18ᵃ of the cover adjacent the launder 17, thereby producing a flow beneath the cover 18 toward the discharge point, such flow of the gas or air serving to skim or move the bubbles toward the launder, whereby, it will be seen, I am able to utilize the aeration gas to aid the discharge of the metal-carrying bubbles.

While I have shown my cell as constructed of metal, it will be obvious that wood, or other suitable material, may be used for the purpose. It will also be obvious that my invention is susceptible of many modifications and improvements, and I do not wish to be restricted to the form shown and described, except as defined in the appended claims.

What I claim is:

1. In apparatus of the class described, an aeration cell, a series of aeration pans carried thereby, and a concentrate launder, said series terminating short of said launder so as to provide a dead area within said cell intermediate said pans and said launder, said cell being provided with a top extending over substantially the whole of said cell, said top being provided with a discharge portion adjacent said launder.

2. In apparatus of the class described, an aeration cell, a series of aeration pans carried thereby, a concentrate launder, said series terminating short of said launder so as to provide a dead area within said cell adjacent said launder, and a collecting apron located beneath said dead area, said apron being constructed and arranged to return collected particles toward the bottom of said cell, said apron being provided with means to direct said collected particles over said aeration means.

3. In apparatus of the class described, an aeration cell, aerating means carried thereby, a concentrate launder, said cell being provided with a dead area between said aerating means and said launder, and a collecting apron located therebeneath and inclined toward the bottom of said cell, said apron being provided with an extension terminating in close proximity to the bottom of said cells and over said aerating means.

4. In apparatus of the class described, a cell having aeration means, said cells being provided with a securely fitted top, said top being provided with a discharge portion and being so positioned relatively to the normal level within said cell as to coact with the froth therein to produce a flow thereof in the direction of said discharge portion, and means whereby said level may be varied to thereby regulate the amount of discharge from said cell.

In testimony whereof, I have subscribed my name.

GEORGE C. RISER, Jr.